United States Patent [19]

Snell

[11] Patent Number: 4,538,470
[45] Date of Patent: Sep. 3, 1985

[54] FLOW METERING TUBE INSERT AND METHOD

[76] Inventor: Clarence G. Snell, P.O. Box 129, Aztec, N. Mex. 87410

[21] Appl. No.: 487,738

[22] Filed: Apr. 22, 1983

[51] Int. Cl.³ .............................................. G01F 1/42
[52] U.S. Cl. ................................................ 73/861.61
[58] Field of Search ......................... 73/861.61, 861.62

[56] References Cited

U.S. PATENT DOCUMENTS

| | | |
|---|---|---|
| 1,146,409 | 7/1915 | Dolbey . |
| 1,698,314 | 1/1929 | Mapelsden . |
| 1,813,100 | 7/1931 | Swindle . |
| 2,071,191 | 2/1937 | Wotring . |
| 2,365,573 | 12/1944 | McGay ................................ 73/716 |
| 2,942,465 | 6/1960 | Carbone ......................... 73/861.61 |
| 3,387,492 | 5/1966 | Mannherz et al. . |
| 3,487,688 | 1/1970 | Magliozzi . |
| 3,680,376 | 8/1972 | Catheron ........................ 73/861.61 |
| 3,779,076 | 12/1973 | Akeley . |
| 3,921,448 | 11/1975 | Masnik et al. . |
| 4,003,253 | 1/1977 | Yard et al. ...................... 73/861.22 |
| 4,393,722 | 7/1983 | Scott ................................ 73/861.61 |

FOREIGN PATENT DOCUMENTS

| | | | |
|---|---|---|---|
| 1202147 | 8/1970 | United Kingdom ............. | 73/861.61 |
| 2038479 | 7/1980 | United Kingdom . | |

*Primary Examiner*—Tim Miles
*Attorney, Agent, or Firm*—Wegner & Bretschneider

[57] ABSTRACT

A calibrated flow metering tube insert consisting of an upstream and a downstream part to be installed in an existing metering tube of a larger diameter to reestablish the correct Beta Ratio range. The larger tube is removed from service and the insert installed and fixed in the proper position. Pipe nipples are placed through the existing orifice plate holder and connected to the insert at the differential pressure tap holes. This process allows the operator to utilize the larger, existing, primary orifice fitting or orifice flanges and his existing inventory of orifice plates, thereby eliminating the need to replace the complete metering tube.

9 Claims, 4 Drawing Figures

SECTION A-A

FLOW METERING TUBE INSERT AND METHOD

BACKGROUND OF THE INVENTION

This invention relates to the pipe diameter to orifice diameter (Beta-Ratio) in the measurement of fluids using concentric orifice as the primary element.

The American Gas Association's report Number Three set the recommended orifice to pipe diameter ratio (d/D="B") using "Flange Taps" to be between 0.15 and 0.70 (Ref.,AGA Report 3, Paragraph 2.2,6). The report states that ratios as low as 0.10 may be used, but the flow constants, Fb, for these extreme values of "B" are subject to higher tolerances and should be avoided.

At this point the need arises to modify the metering station. It has been the common practice to replace the metering tube with one of a smaller diameter to reestablish a workable Beta Ratio range. I believe that my invention will provide a more practical and useful means of accomplishing this modification. The problem this invention solves is explained in the following paragraphs.

As the fluid flow across the orifice meter decreases, a smaller orifice must be installed so that a differential in pressure is maintained at a recording instrument (such as one described in U.S. Pat. No. 2,365,573, to J. B. McGay). If the fluid flow drops to the point that installation of a smaller orifice exceeds the recommended Beta Ratio, some corrective action must be taken if accurate measurement of the fluid is to be maintained.

An example of such a situation is a producing gas field that is experiencing a dropping demand for its product. When the fluid flow in its distribution system is curtailed, the flow from wells delivering gas into the system is reduced, slowing the fluid flow across its numerous metering stations, thereby necessitating the installation of smaller orifices. The flow from marginal wells in the system can no longer be accurately measured.

(As an example: A 4" metering tube that requires a $\frac{3}{8}$" orifice ((Beta-Ratio 0.09)) to produce a recordable differential pressure but is below AGA recommendations of 0.15 Beta-Ratio). The choice of corrective action has been limited to replacing the meter tube with one of a smaller diameter (A 2" metering tube with a $\frac{3}{8}$" orifice ((Beta-Ratio 0.18)). In a field with many low pressure wells in its system, this solution is a very expensive undertaking.

OBJECTS OF THE INVENTION

Accordingly, it is the object of this invention to provide a means of re-establishing the ratio of pipe diameter to orifice diameter (Beta-Ratio) in metering tubes that are in service.

It is another object of the invention to provide an inexpensive means of maintaining accuracy in the measurement of fluid flow rates in low pressure gas wells.

It is a further objective of the invention to provide a new calibrated metering tube while utilizing the primary orifice fitting of a larger diameter metering tube.

Still another objective of this invention is to allow a user to employ an existing inventory of larger diameter orifice plates in a smaller diameter metering tube.

Other advantages will be shown by referring to the accompanying claims and drawings.

DESCRIPTION OF DRAWINGS

Referring now to FIG. 1, #1 is a metering tube insert that is constructed in the following manner: Using a selected section of cold drawn seamless tubing or equal, a reducer 1, is welded to tubing. A section of steel 3 is then machined to fit closely the inside of the selected metering tube 5 and over the conduit. Holes 14 are drilled and tapped in the steel fitting 3, to accept a pipe to be placed there. The steel fittings 3 are then welded to the two sections of the insert 2 along with a spacer 4.

Figure 1:
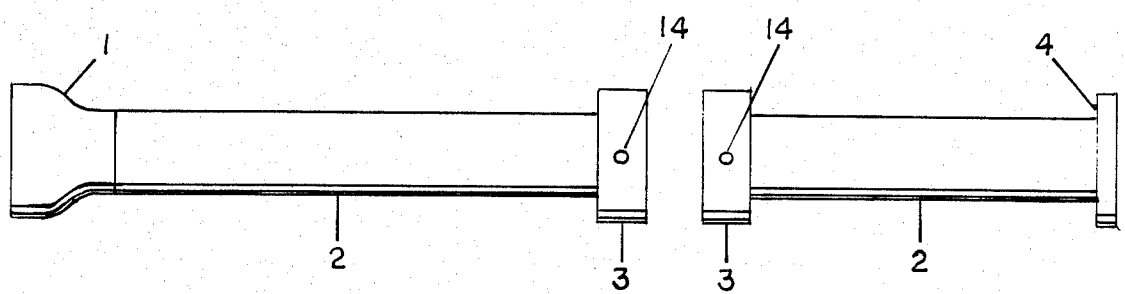
FIG. 1. A drawing of a meter tube insert, utilizing a primary orifice fitting reducing fixture 3, conduit to carry the fluid flow, a concentric reducing fitting 1 and a spacer 4, and pressure differential tap holes 14.
Figure 2:
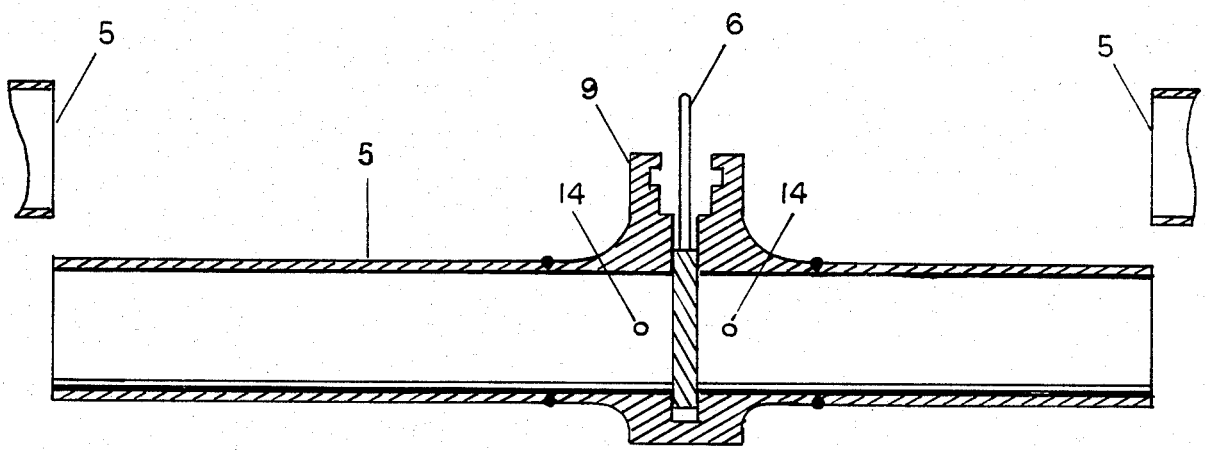
FIG. 2. Represents an existing metering tube 5, an existing primary orifice fitting 9, a spacing plate 6.

A metering run is selected and removed from service, FIG. 2. The sealing bar 13 and orifice plate holder 11 are removed and a spacing fixture 6 is inserted to guarantee the correct placement of the insert 2 in the primary orifice fitting 9.

Figure 3:
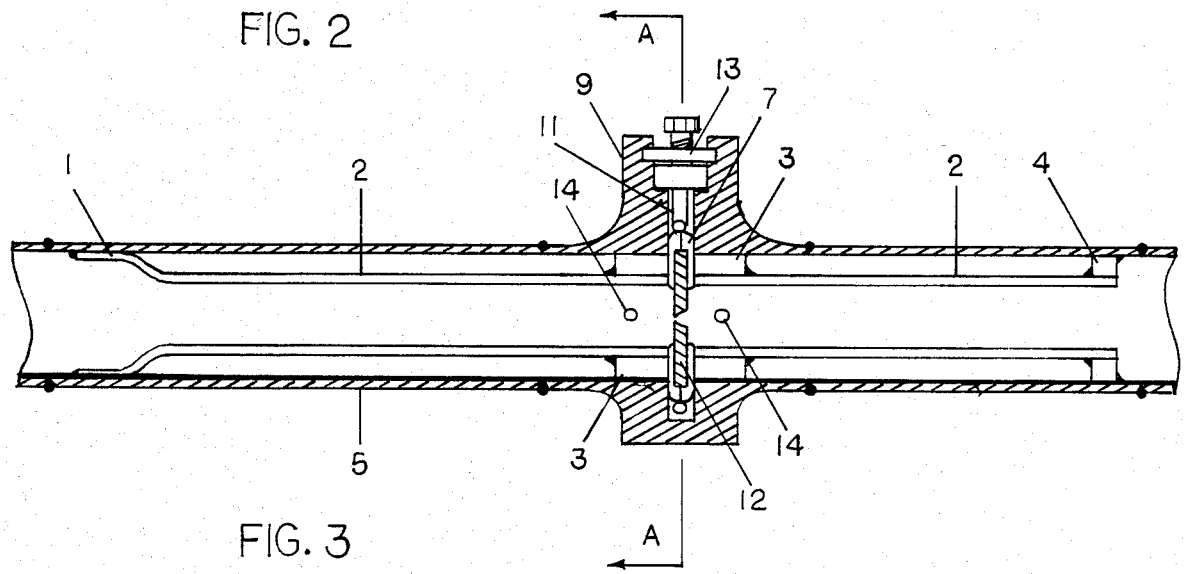
FIG. 3. Depicts an existing metering tube 5 with an insert 2 fixed in place.

In FIG. 3, the two sections of the insert 2 are placed into the existing metering tube 5 and held securely against the spacing fixture 6. The reducer 1 is then attached, usually by welding, to the metering tube 5, securing the upstream section of the insert in place. The spacer 4 is then attached in a like manner, fixing the downstream section in place.

Figure 4:
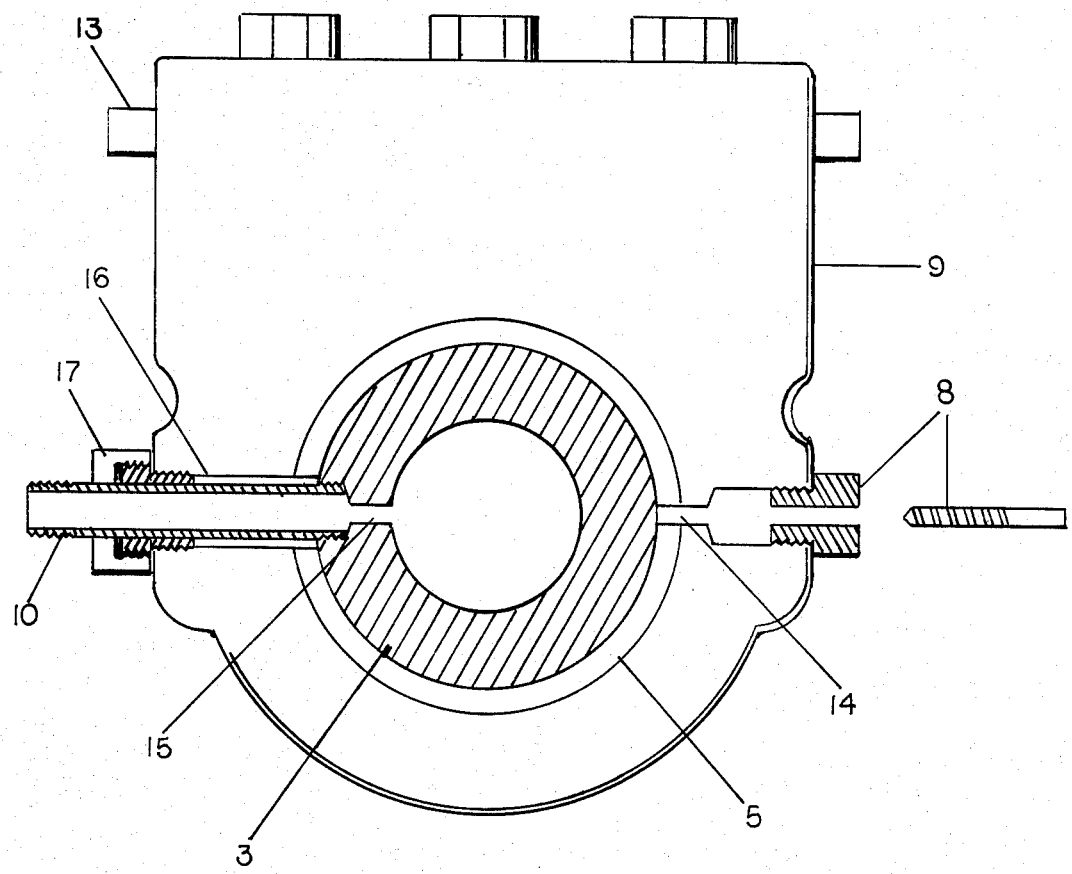
FIG. 4. A sectional view of the primary orifice fitting 9 illustrating the method used to bring the differential pressure through the insert 2 and the sealing 17 of the conduit 10 after it passes through the existing primary orifice fitting 9.

Referring to Section A—A, FIG. 4, a drill guide 8 is secured in the tap hole 14 of the primary orifice fitting 9, and a hole is drilled through the steel fitting 3 so as to establish a new pressure tap hole 15 at the correct position to the orifice plate 12, FIG. 3.

A larger diameter hole 16 is then drilled to a depth of half the thickness of the steel fitting 3 and threaded to accept the pipe 10 through which the differential pressure will pass. A seal 17 is then fixed to the primary orifice fitting at the point where the pipe 10 exits the primary orifice fitting 9. The existing metering tube 5 is then replaced in its original position, FIG. 3. The enlarged seal 7 secures the sealing of the orifice plate and the smaller diameter metering tube insert.

This procedure effectively produces a smaller diameter metering tube using a larger diameter metering tube's primary orifice, thus saving the user the expense of replacing a complete metering tube when one of a smaller diameter is desired.

I claim:
1. A method of modifying an orifice plate-type fluid metering station to establish a desired Beta Ratio while maintaining a desired pressure drop across the orifice plate, comprising:
    selecting and removing from service an existing metering tube run of a first internal diameter and including an orifice fitting with removable orifice plate holding means;
    replacing the orifice plate holding means with a spacing means;
    securing first and second inserts of a second internal diameter which is smaller than said first diameter in said tube run so as to abut opposite sides of said spacing means;

forming a pressure tap hole in each of said inserts;

installing differential pressure tap pipes in said tap holes;

removing said spacing means; and installing the orifice plate holding means and an orifice plate of desired size.

2. An orifice plate-type flow metering tube, comprising:

a metering tube run of a first internal diameter, having an orifice fitting with a removable orifice plate holding means;

means for establishment a desired workable Beta Ratio while maintaining a desired pressure drop across an orifice plate held by said orifice plate holding means, comprising first and second inserts having a second internal diameter which is smaller than said first internal diameter, secured within said metering tube run and abutting opposite sides of said orifice plate holding means;

said first and second inserts each being provided with a pressure tap hole; and differential pressure sensing pipes in said tap holes.

3. The tube of claim 2, further comprising an orifice plate held by said holding means.

4. The tube of claim 3, wherein each of said first and second inserts comprises end sections having an outer diameter substantially equal to said first diameter and a middle section having an outer diameter which is less than said first diameter.

5. The tube of claim 4, wherein the holding means comprises sealing means to secure sealing with the inserts.

6. An orifice plate-type flow metering tube, comprising:

a metering tube run of a first internal diameter, having an orifice fitting for accepting a removable orifice plate holding means;

spacing means in said orifice fitting, replacing said holding means; and means for establishing a desired workable Beta Ratio while maintaining a desired pressure drop across an orifice plate held by said orifice plate holding means comprising first and second inserts having a second internal diameter which is smaller than said first internal diameter, secured within said metering tube run and abutting opposite sides of said spacing means.

7. The tube of claim 6, wherein each of said first and second inserts comprises end sections having an outer diameter substantially equal to said first diameter and a middle section having an outer diameter which is less than said first diameter.

8. The tube of claim 6, wherein said first and second inserts each are provided with a pressure tap hole.

9. The tube of claim 8, further comprising differential pressure sensing pipes in said tap holes.

* * * * *